UNITED STATES PATENT OFFICE.

ROBERT HARRIS REEVES, OF LONDON, ENGLAND.

METHOD OF DISINFECTING.

SPECIFICATION forming part of Letters Patent No. 631,228, dated August 15, 1899.

Application filed December 29, 1897. Serial No. 664,456. (No specimens.)

*To all whom it may concern:*

Be it known that I, ROBERT HARRIS REEVES, a subject of the Queen of Great Britain, residing at Cedardale, Putney Bridge road, Putney, London, England, have invented certain new and useful Improvements in Methods or Processes for Suppressing Noxious Vapors, (for which I have obtained Letters Patent in Great Britain, dated September 28, 1895, No. 18,185,) of which the following is a specification.

This invention has for its object to provide new and improved means for purifying the air of drains and sewers or for suppressing noxious vapors generally. This object I accomplish in the manner hereinafter described, and specified in the claims.

In order to enable those skilled in the art to practice my invention, I will now describe the same in detail.

I mix sulphuric acid with manganate of soda and carbon or wood dust, all in a dry condition, for the purpose of generating a larger volume of gas when the dry mixture is used, as hereinafter set forth.

For the purpose of my invention the generating of gases (oxygen and sulphurous acid) consists in mixing manganate of soda and carbon or fine wood dust in a dry powdered state with sulphuric acid, whereby the acid at once comes in contact with the entire body of manganate of soda. By this method a much larger percentage of gases is given off, which destroys those impure gases given off from sewage or those contained in the atmosphere of confined spaces. The carbon dust or its equivalent, wood dust, added in a dry condition to the manganate of soda is very important in that the body of soda is thereby rendered porous, which enables the acid to quickly permeate and attack the whole of the manganate of soda. This secures the best result, because immediate and constant action takes place and the gases are evolved in large volume, which is maintained until the whole or nearly the whole of the manganate of soda is consumed. If the soda is used without the carbon dust or its equivalent, fine wood dust, the soda amalgamates under the action of the sulphuric acid and cakes on the top, thereby preventing the proper action. This also produces intense heat, and in nearly all cases the sulphuric acid only affects the top portion of the manganate of soda and is so long in acting that the volume of gases evolved is too small to be of practical use. In the employment of carbon dust or its equivalent, fine wood dust, the dry mixture, according to my invention, is placed in sewers, drains, spaces, or openings leading to them. The dry mixture may be placed on a flat disk or plate or in a vessel lowered into the drain, sewer, or space. The sulphuric acid is then allowed to drop on the prepared manganate of soda and carbon or wood dust, when by the action of one chemical on the other large volumes of gases are generated which purify all foul air. After these gases are evolved, as above described, water is mixed with the residue mixture, by which it is formed into a strong solution of permanganic acid. This treats the sewage or other matter flowing through drains or culverts. The mixing of these chemicals for producing gases and permanganic acid may be accomplished by hand or through the medium of any suitable means.

Having thus described my invention, what I claim is—

1. The method or process herein described of suppressing noxious vapors, which consists in adding carbon dust to manganate of soda in a dry condition, and mixing sulphuric acid with the said manganate preparation, to evolve gases which act upon the noxious vapors, substantially as set forth.

2. The method or process herein described of suppressing noxious vapors and purifying sewage, which consists in mixing sulphuric acid with a dry mixture of manganate of soda and carbon dust, and after the gases are evolved, adding water to the residue mixture to form permanganic acid which acts on the sewage, substantially as set forth.

3. A mixture for the purpose described, consisting of an intimate admixture of manganate of soda and carbon dust in a dry state designed for use in connection with sulphuric acid, the carbon dust being in sufficient quantity to prevent solidifying when the acid is brought into contact with the mixture as and for the purpose specified.

In testimony whereof I have hereunto set my hand in presence of two subscribing witnesses.

ROBERT HARRIS REEVES.

Witnesses:
    EDMUND STANHOPE SNEWIN,
    WILLIAM OSWALD BROWN.